March 13, 1928. 1,662,403
W. F. STIMPSON ET AL
SCALE
Filed Jan. 25, 1926 4 Sheets-Sheet 2
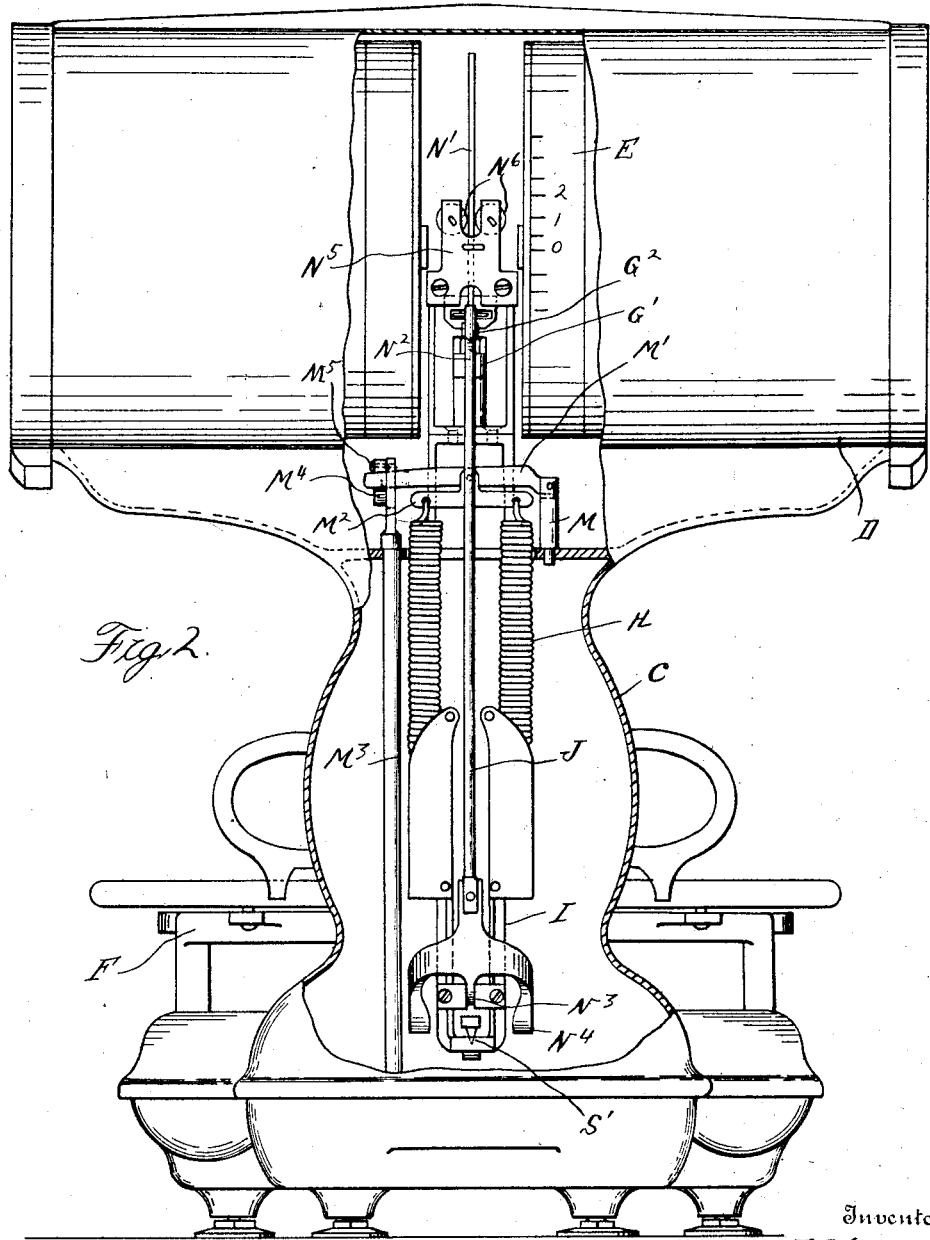
Inventors
Walter F. Stimpson,
Willis E. Finch.
By Whittemore Hulbert Whittemore
& Belknap Attorneys

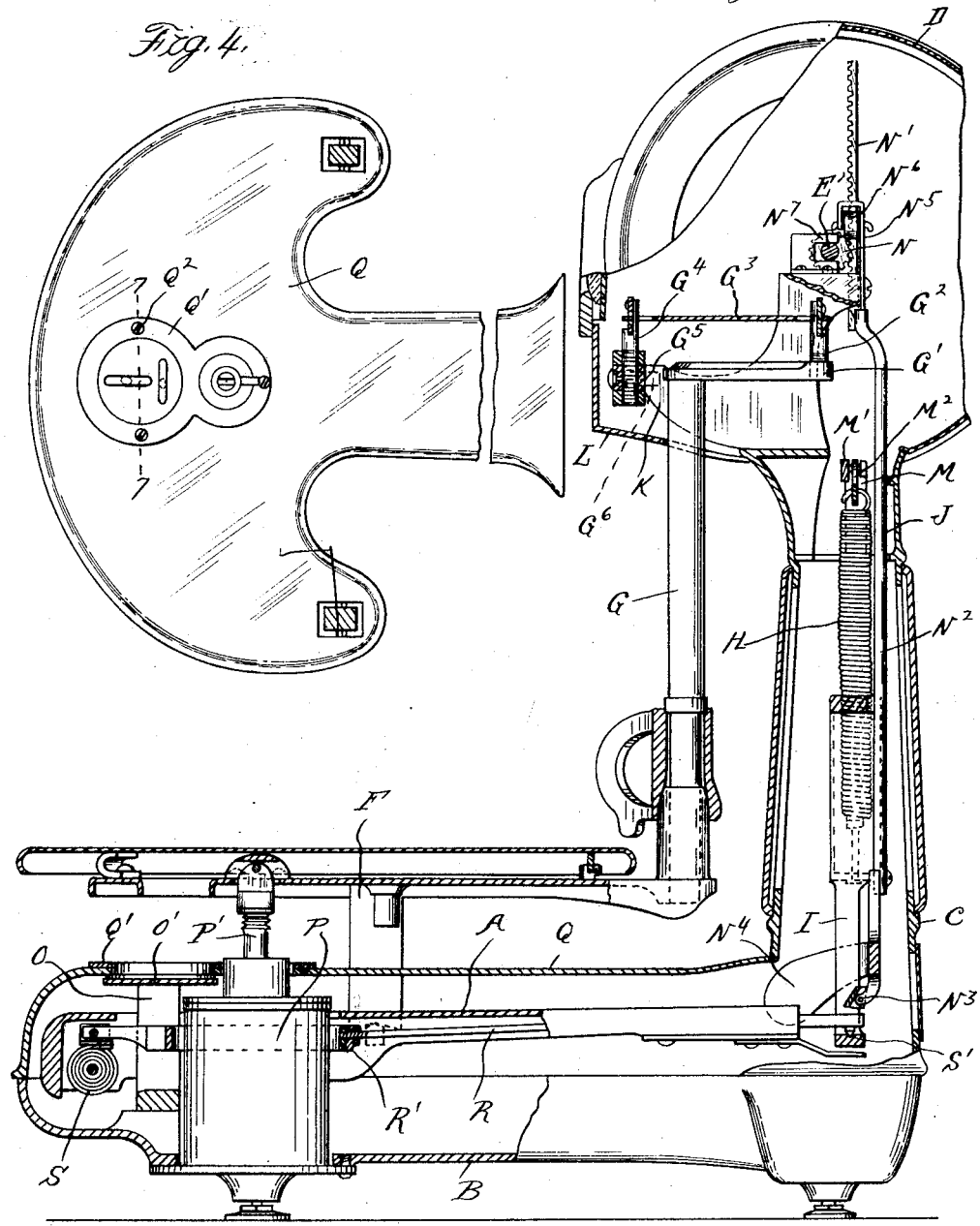

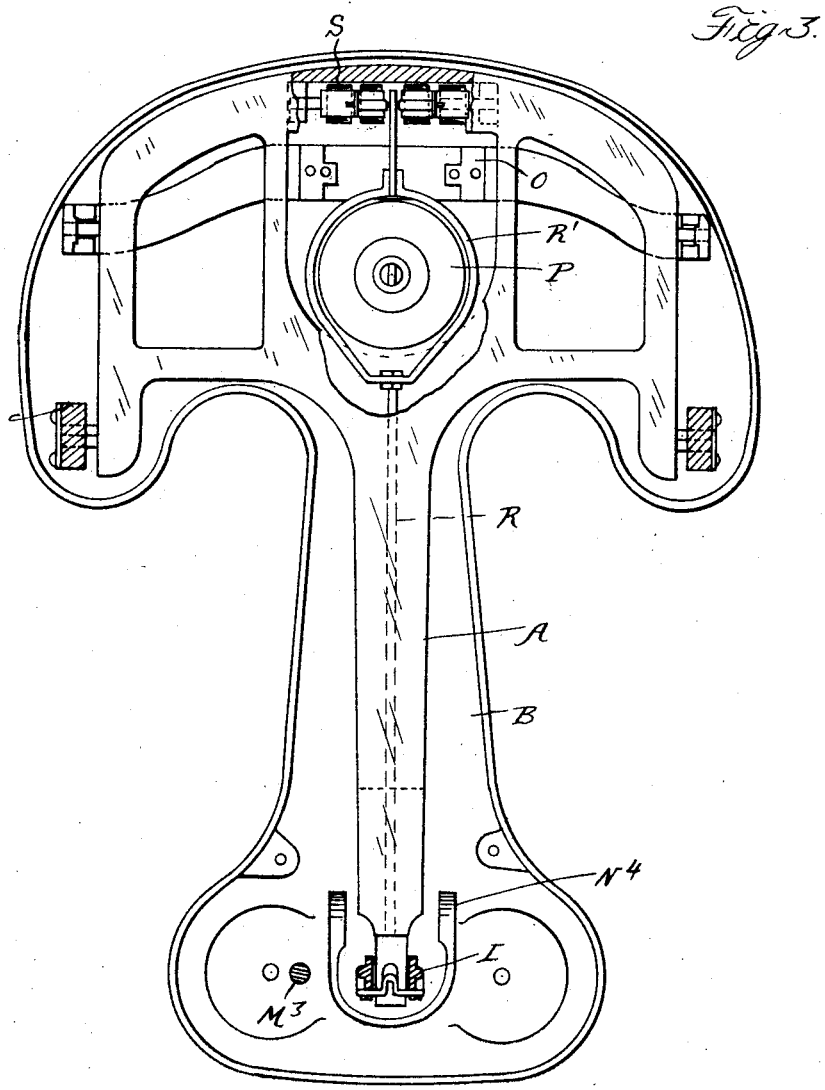

March 13, 1928.
W. F. STIMPSON ET AL
SCALE
Filed Jan. 25, 1926
1,662,403
4 Sheets-Sheet 4
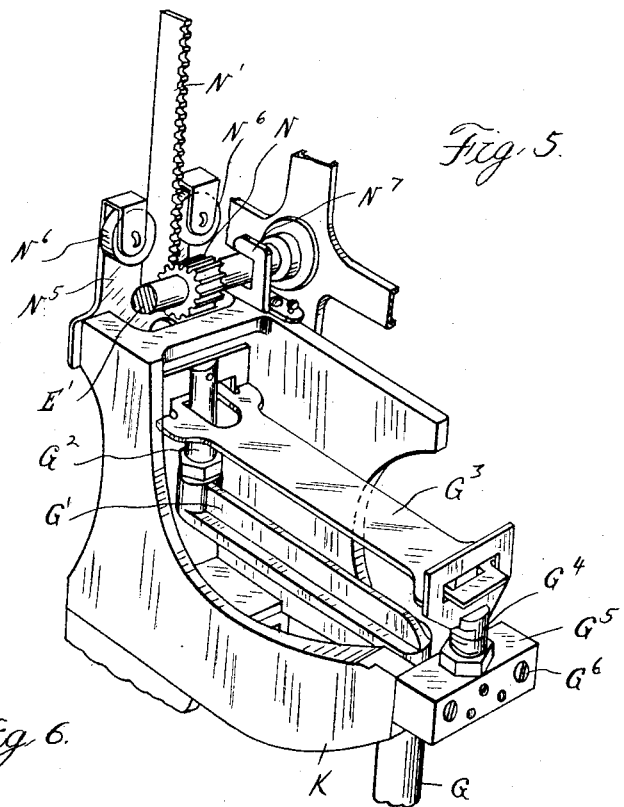
Fig. 5.
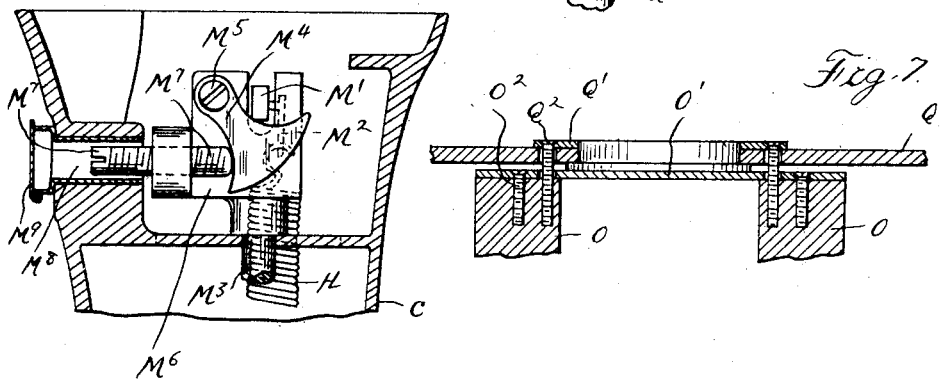
Fig. 6.
Fig. 7.
Inventors
Walter F. Stimpson,
Willis E. Finch
By Whittemore Hulbert Whittemore
& Belknap
Attorneys Patented Mar. 13, 1928.

1,662,403

UNITED STATES PATENT OFFICE.

WALTER F. STIMPSON AND WILLIS E. FINCH, OF LOUISVILLE, KENTUCKY; SAID FINCH ASSIGNOR TO SAID STIMPSON.

SCALE.

Application filed January 25, 1926. Serial No. 83,704.

The invention relates to scales and consists in various features of construction as hereinafter set forth.

In the drawings:

Figure 1 is a vertical central section through our improved scale.

Figure 2 is a rear elevation thereof.

Figure 3 is a sectional plan view with the platform and upper portion of the housing for the platform levers removed.

Figure 4 is a similar view showing the housing in position.

Figure 5 is a perspective view of a portion of the frame showing the manner of attaching the platform check rods thereto.

Figure 6 is a section showing the adjusting mechanism for setting the indicator at zero.

Figure 7 is a cross section on the line 7—7 of Figure 4 showing the manner of securing in position the cover of the housing for the platform levers.

In the general construction, the scale to which our improvements are applied comprises a platform supporting lever A housed within a casing B conforming to the general lines of contour of said lever. At the rear end of said housing is the hollow pedestal C having mounted at its upper end the housing D for the cylinder indicator E. F is the platform supported on the platform lever A and G is the check rod which holds the platform from tipping without interference with its freedom of movement with the lever A. H are the weighing springs connected to the platform lever through the medium of the steelyard rod I and J is a rod pivotally attached to the steelyard rod for actuating the indicator.

One of the features of our improvement is the means for detachably anchoring the check rod to the scale frame. In constructions heretofore used the check rod has extended upward from the platform into the housing for the indicator and has been anchored to the frame through the medium of a swinging link which must be removed when the rod is to be detached. With our present construction the check rod and swinging link form a permanent assembly which is attached to the frame through the medium of clamping screws and which therefore may be detached by the removal of said screws. As shown, the rod G which rises from the platform has the rearwardly extending arm G' with a post $G^2$ extending upward therefrom. $G^3$ is a link preferably formed of a sheet metal stamping apertured to engage the post $G^2$ and to have a knife-edged bearing thereon, while at its opposite end it is similarly apertured for engagement with a post $G^4$. The latter is mounted in a block $G^5$ which is attached to the front of the scale frame K by screws $G^6$. All of these parts are normally concealed by a removable front plate L of the housing D, the arrangement being such that when said plate is removed the whole check rod assembly may be readily attached or detached by manipulation of the screws $G^6$.

Another feature of the invention is the means for adjusting the anchorage for the weighing springs so as to set the scale when unloaded at zero indication. As shown, the hollow pedestal C has mounted near its upper end a post M to which is pivoted the lever M' having attached thereto the evener lever $M^2$ forming the direct anchorage for the spring H. The opposite end of the lever M' is supported upon a rod $M^3$ rising from the base and which is formed of a metal having a different coefficient of expansion from that of the material forming the column C so as to compensate for contraction or expansion by temperature variations. The zero adjusting means comprises a member $M^4$ pivotally attached at $M^5$ to a block $M^6$ at the upper end of the rod $M^3$, said member $M^4$ having a cam portion for engaging the free end of the lever M' and being adjusted by a screw $M^7$ operable from the front of the pedestal. This screw is preferably rendered accessible through an aperture $M^8$ in the frame normally closed by the hinge cap $M^9$, said aperture being of sufficient size to allow for all normal expansion or contraction of thermostat rod $M^3$. Thus, by adjusting the screw $M^7$ the lever M' may be raised or lowered carrying with it the evener lever $M^2$ and thereby effecting the desired adjustment.

Another feature of the invention is the means for operating the indicator. This generally is through the medium of a pinion N on the shaft E' of the cylinder indicator E and a rack bar N' engaging said pinion and actuated from the steelyard rod J. To minimize the angular deflection of the rack due to the oscillation of the platform lever A on its pivot, said rack is carried by a rod $N^2$ which extends to near the point of attachment of the steelyard rod to the platform lever and is there pivotally attached to the steelyard rod as indicated at $N^3$. The rod $N^2$ must be rearwardly offset to avoid interference with the steelyard rod and to counter balance this rearwardly offset portion and also to hold the rack engaged with the pinion there is provided at the lower end the forwardly projecting counterweight portion $N^4$ preferably bifurcated to embrace the steelyard rod. The proportion of the parts is such as to slightly over balance the rack when in its plane for actuating the pinion, and this relieves from any friction on the bearings which might interfere with the accuracy of operation. However, the rack $N'$ is retained from disengagement from the pinion by a plate $N^5$ in the rear thereof and it is otherwise guided by anti-friction rolls $N^6$ on opposite sides thereof. This arrangement transmits the motion of the steelyard rod to the shaft $E'$ of the cylinder E with the minimum of friction. Also the shaft $E'$ is preferably provided with limit bearings $N^7$ above and below the same, which are normally out of contact therewith but will limit any deflection of the shaft in either upward or downward direction.

Another feature of the invention is the means for holding in position the cover of the housing for the platform lever. It is quite common to provide scale housings with a vitreous enamel finish and on account of the brittle nature of this material it is undesirable to use attaching screws or bolts in contact therewith. It is also usual to provide levelling means for the scale frame which is preferably mounted on a fixed portion of the frame. With our improvement we make use of the levelling device as a means of attachment for the removable cover of the housing, the construction being as follows: O is a bifurcated upward projection of the platform housing B which has secured to its upper face the level holding plate $O'$ by means of screws $O^2$. This level holding plate is preferably circular in contour and is preferably arranged adjacent to the dash pot P which also is mounted on the housing member B, the plunger $P'$ being attached to the platform F. Q is the cover or complementary upper section of the housing for the platform lever being of similar contour to the member B and marginally resting thereon. The cover Q is apertured for the passage of the dash pot plunger and the level holder $O'$, said aperture being preferably surrounded by a correspondingly apertured plate $Q'$. This plate $Q'$ is secured by screws $Q^2$ to the bifurcated bearing O and thus the cover is held in position without direct engagement of any screws or bolts therewith.

Still another feature of our improvement is the specific arrangement of the compensating means for temperature variations in the length of the platform lever. Heretofore such levers have been provided with thermostats by means of which the point of pivotal attachment of the steelyard rod and platform lever may be slightly changed and this is preferably arranged in the central plane of the platform lever, the thermostat being at one end thereof and the steelyard rod pivot at the opposite end. With our improved scale the dash pot P being arranged in the central plane, we have formed the thermostat rod R with a loop $R'$ thereon surrounding the dash pot with sufficient clearance to avoid any contact therewith. Thus, the forward and rear ends of the bar R may be in the central plane of the scale, one end being attached to a coiled thermostat S and the other end to the steelyard rod pivot $S'$. The variations in position of this rod are but slight and come well within the clearance provided in the loop $R'$ so that there will be no interference with the freedom of the rod.

What we claim as our invention is:

1. In a scale, the combination with a frame and a pedestal rising therefrom, of a pivotally supported platform, a check rod rising from said platform and having a rearwardly extending arm at its upper end, a pivot post at the rear end of said arm, a link pivotally engaging said post, and extending forward, a pivot post engaging the forward end of said link, and means for detachably securing said pivot post to said pedestal whereby said entire check rod assembly may be attached or detached as a unit.

2. In a scale, the combination with a frame and a pedestal rising therefrom, a cylindrical chart housing at the upper end of said pedestal, a pivotal platform, a check rod rising from said platform adjacent to said pedestal and extending into said chart housing, a rearwardly extending arm on said rod, a pivot post on said arm, a check link engaging said post and extending forwardly, a pivot post for the forward end of said link and means for detachably securing said latter post to said pedestal whereby said check rod assembly may be attached or detached as a unit.

3. In a scale, the combination with a housing containing the platform levers, a pedestal rising therefrom and a housing at the upper end of said pedestal for a cylinder indicator, of a platform above the housing for said lever, a check rod extending upward from said platform into the housing on said pedestal, an arm extending rearward from said check rod, a link parallel to said arm, pivot posts engaging opposite ends of said link, one being on the rear end of said arm, a bracket bearing on said pedestal within the housing thereon and means for detachably securing the other of said pivot posts to said bracket bearing whereby said check rod assembly may be attached or detached as a unit.

4. In a scale, the combination with a hollow pedestal, of a weighing spring therein, a lever mounted on said pedestal forming an anchorage for said spring, a thermostatic rod extending from a fixed support within said pedestal into proximity to said lever and means operable from outside the pedestal for adjustably supporting said lever on said thermostatic rod.

5. In a scale, the combination with a hollow pedestal, of a pair of weighing springs therein, an evener lever forming an anchorage for said weighing springs, a lever to which said evener lever is pivotally attached mounted on said pedestal, a thermostatic rod within said pedestal and engaging a fixed bearing at one end, the other end extending into proximity to said lever and means operable from outside the pedestal for adjustably supporting said lever on said thermostatic rod.

6. In a scale, the combination with a hollow pedestal, of weighing springs located within said pedestal, an evener lever forming an anchorage for said weighing springs, a lever fulcrumed on said pedestal and pivotally connnected to said evener lever, a thermostatic rod extending from a fixed bearing at the base of said pedestal into proximity to said last mentioned lever, a pivotal member engaging the free end of said lever to raise or lower the same and an adjusting screw extending horizontally to be operable from outside the pedestal and engaging said pivotal member to rock the same and thereby actuate said lever.

7. In a scale, the combination with a hollow pedestal and a housing at the upper end thereof for a rotary indicator, of a steelyard rod extending upward within said hollow pedestal, a rack and pinion for operating said rotary indicator located above said steelyard rod, a rod for actuating said rack extending downward parallel to said steelyard rod and pivotally attached to the latter near its lower end, said rod being laterally offset between its ends to clear said steelyard rod, and an arm extending from said rod in a direction opposite to the offset rod forming a counter balance therefor.

8. In a scale, the combination with a hollow pedestal, a housing at the upper end thereof for a rotary indicator, of a steelyard rod extending upward within said pedestal, a rack and pinion operating connection for said rotary indicator, a rod for actuating said rack pivotally connected near the lower end of said steelyard rod and extending upward parallel thereto being laterally offset between its ends to clear said steelyard rod, and a pair of arms extending from said rod in a direction opposite to said offset and upon opposite sides of said steelyard rod to form a counter balance for said offset rod and a means for holding said rack in engagement with said pinion.

9. In a scale, the combination with a hollow pedestal of a housing at the upper end thereof, a cylindrical indicator within said housing, a steelyard rod within the pedestal, a shaft on which said indicator is mounted, journaled in bearings within said housing, a pinion on said shaft, a rack for engaging said pinion, a rod for actuating said rack extending downward within said hollow pedestal and pivotally attached at its lower end to a movable part of the scale mechanism, and a bifurcated arm straddling said steelyard rod and extending laterally from said rod in a direction to form a counter balance for holding said rack in engagement with said pinion.

10. In a scale, the combination with a rotary indicator and a horizontally extending shaft on which said indicator is mounted journaled at its opposite ends of a pinion mounted on said shaft centrally thereof, a rack engaging said pinion, and a bifurcated member embracing said shaft adjacent to said pinion normally out of frictional contact therewith but limiting the deflection of said shaft in either direction when actuated by said rack and pinion.

11. In a scale, the combination with a platform supporting lever, a housing for said lever having a detachable cover portion, a level holder extending upward from the fixed portion of said housing through an aperture in said cover portion, and means for securing said cover engaging said level holder.

12. In a scale, the combination with a rotary indicator, a shaft on which said indicator is mounted, a pinion mounted centrally of said shaft, a rack for engaging said pinion, gravity actuated means for pressing said rack into engagement with said pinion and roller bearings on opposite sides of said rack forming antifriction guides therefor.

13. In a scale, the combination with a platform supporting lever, of a housing therefor conforming to the general contour thereof, and provided with a detachable cover section marginally resting on the fixed section, a level holder projecting upward from the fixed section through an aperture in the cover section, an aperture plate surrounding the aperture in said cover section and securing means for said plate engaging said level holder and thereby also securing said cover section.

14. In a scale, the combination with a platform supporting lever, of a housing therefor, provided with a detachable cover section, said housing and cover being provided with a vitreous enamel finish, a level holder projecting upward from the fixed housing through an aperture in the cover section, a ring above said cover section surrounding said level holder, and means for detachably securing said ring to said level holder whereby said cover section is retained without direct engagement of securing means therewith.

15. In a scale, the combination with a platform supporting lever, of a housing surrounding said lever and conforming to the general contour thereof, said housing being provided with a detachable cover section, a level holder mounted on the fixed portion of said housing and projecting upward through an aperture in the cover therefor, a dash pot also mounted in the fixed housing and having its plunger projecting through an aperture in said cover and a plate above said cover surrounding the apertures for said level holder and dash pot and means for detachably securing said plate to said level holder.

16. In a scale, the combination with a platform supporting lever, of a housing for said lever and providing the fulcrum bearings therefor, a dash pot arranged within said housing centrally of said lever and extending through a cut away portion thereof, a thermostat mounted at one end of said lever for automatically adjusting a pivot bearing at the opposite end thereof, and a rod extending from said thermostat to said pivot bearing having a ring portion surrounding and clearing said dash pot.

In testimony whereof we affix our signatures.

WALTER F. STIMPSON.
WILLIS E. FINCH.